United States Patent [19]

Numa

[11] Patent Number: 4,886,852
[45] Date of Patent: Dec. 12, 1989

[54] PROCESS FOR PREPARING AN AQUEOUS DISPERSION

[75] Inventor: Nobushige Numa, Ebina, Japan

[73] Assignee: Kansai Paint Company, Limited, Amagasaki, Japan

[21] Appl. No.: 254,625

[22] Filed: Oct. 7, 1988

[30] Foreign Application Priority Data

Oct. 12, 1987 [JP] Japan ............................. 62-257930

[51] Int. Cl.$^4$ ............................................. C08F 2/16
[52] U.S. Cl. ..................................... 524/458; 524/521
[58] Field of Search ................ 524/521, 458; 525/288

[56] References Cited

U.S. PATENT DOCUMENTS 3,706,697 12/1972 Backderf ............................. 525/288

*Primary Examiner*—Joseph L. Schofer
*Assistant Examiner*—Jeffrey T. Smith
*Attorney, Agent, or Firm*—Armstrong, Nikaido, Marmelstein, Kubovcik & Murray

[57] ABSTRACT

A process for preparing an aqueous dispersion, the process being characterized by comprising the steps of (i) preparing a nonaqueous dispersion of polymer particles by polymerizing a radically polymerizable unsaturated monomer (A) in an organic solvent, in which the polymer particles are insoluble, in the presence of, as a dispersion stabilizer resin, a copolymer which is prepared by copolymerizing an alkoxysilane group-containing vinyl monomer represented by the formula

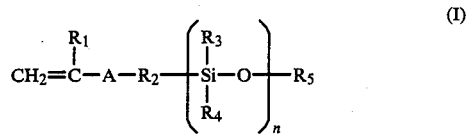

(wherein A is a group

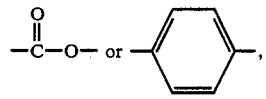

$R_1$ is a hydrogen atom or methyl group, $R_2$ is a saturated bivalent aliphatic hydrocarbon group having 1 to 6 carbon atoms, $R_3$ and $R_4$ are the same or different and each represent a phenyl group, alkyl group having 1 to 6 carbon atoms or alkoxy group having 1 to 10 carbon atoms, $R_5$ is an alkyl group having 1 to 10 carbon atoms, and n is an integer of 1 to 100), a carboxyl group-containing unsaturated monomer and other polymerizable monomer (B) copolymerizable with these monomers; and (ii) converting the nonaqueous dispersion to an aqueous dispersion.

9 Claims, No Drawings

PROCESS FOR PREPARING AN AQUEOUS DISPERSION

This invention relates to a novel process for preparing an aqueous dispersion.

Various investigations have been heretofore made on processes for preparing aqueous dispersions, mostly on processes by self-emulsification methods or by emulsion polymerization methods. However, the self-emulsification methods using a hydrophilic resin have the drawback of entailing difficulty in forming a stable aqueous dispersion at a high concentration. On the other hand, the emulsion polymerization methods are disadvantageous in that a large amount of highly polar monomers are difficult to use in the method because the polymerization reaction is performed in water. Further the aqueous dispersions prepared by the emulsion polymerization method give a film which is low in water resistance and weatherability and like properties owing to the emulsifying agent (surfactant) remaining in the film.

An object of the present invention is to provide a process for preparing an aqueous dispersion which has an excellent storage stability even at a high concentration and which is capable of producing a film outstanding in the appearance, water resistance, weatherability and mechanical characteristics.

Other objects and features of the invention will become apparent from the following description.

The present invention provides a process for preparing an aqueous dispersion, the process being characterized by comprising the steps of (i) preparing a nonaqueous dispersion of polymer particles by polymerizing a radically polymerizable unsaturated monomer (A) in an organic solvent, in which the polymer particles are insoluble, in the presence of, as a dispersion stabilizer resin, a copolymer which is prepared by copolymerizing an alkoxysilane group-containing vinyl monomer represented by the formula

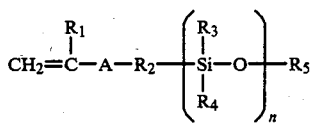

(wherein A is a group

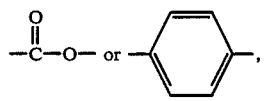

$R_1$ is a hydrogen atom or methyl group, $R_2$ is a saturated bivalent aliphatic hydrocarbon group having 1 to 6 carbon atoms, $R_3$ and $R_4$ are the same or different and each represent a phenyl group, alkyl group having 1 to 6 carbon atoms or alkoxy group having 1 to 10 carbon atoms, $R_5$ is an alkyl group having 1 to 10 carbon atoms, and n is an integer of 1 to 100), a carboxyl group-containing unsaturated monomer and other polymerizable monomer (B) copolymerizable with these monomers; and (ii) converting the nonaqueous dispersion to an aqueous dispersion.

According to the invention, an aqueous dispersion having an excellent storage stability even at a high concentration can be prepared without use of a surfactant by a self-emulsification method. In this method, a nonaqueous dispersion of polymer particles is prepared using as a dispersion stabilizer a copolymer prepared from a specific alkoxysilane group-containing vinyl monomer, a carboxyl group-containing unsaturated monomer and other polymerizable monomer (B), and the resulting nonaqueous dispersion is made into an aqueous one.

In the aqueous dispersion prepared by the process of this invention, the dispersion stabilizer resin present on the surface of polymer particles as a solid phase has a siloxane bond chemically stable in a hydrolyzable substance such as water, basic substance, acidic substance or the like, while silanol group stable in water exists in the interface between the dispersion stabilizer resin and the water. With this structure and due to the repulsion of the electric charges between polymer particles, the aqueous dispersion even if stored for a long term is unlikely to precipitate, separate or aggregate or to provide films with deteriorated properties. The films formed from such aqueous dispersion are outstanding in impact resistance, flexibility and other mechanical characteristics, weatherability and other properties because the continuous phase of the film has siloxane bonds which are optically and chemically stable and because the polymer particles are stabilized in the film so that the polymer particles reinforce the film. The film is afforded improved mechanical characteristics presumably by stress relaxations such as the absorption of external energy resulting from a marked plastic deformation of polymer particles and absorption of impact energy due to crazing caused by the polymer particles.

The films formed from the aqueous dispersion of the invention are unlikely to have shrink or like faults and are remarkable in the appearance and mechanical characteristics because only a small amount of undesired reaction product such as alcohol is formed during the curing due to the presence of polymer particles which do not participate in curing reaction. The particle size of polymer particles can be widely varied by altering the amount of dispersion stabilizer used. This feature also leads to the formation of films having excellent surface smoothness, transparency and mechanical characteristics.

In the compound which is the essential monomer of the copolymer used as the dispersion stabilizer resin and which is represented by the formula

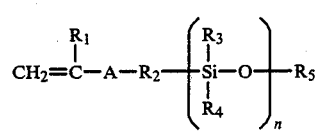

wherein A, $R_1$, $R_2$, $R_3$, $R_4$ and $R_5$ are as defined above, the saturated bivalent aliphatic hydrocarbon group of 1 to 6 carbon atoms represented by $R_2$ include, for example, straight- or branched-chain alkylene groups such as methylene, ethylene, propylene, 1,2-butylene, 1,3-butylene, 2,3-butylene, tetramethylene, ethylethylene, pentamethylene, hexamethylene and the like. Examples of the alkyl groups of 1 to 6 carbon atoms represented by $R_3$ and $R_4$ are straight- or branched-chain alkyl groups such as methyl, ethyl, n-propyl, isopropyl, n-butyl, isobutyl, sec-butyl, tert-butyl, γ-pentyl, isopentyl, neopentyl, n-hexyl, isohexyl and the like. Examples of the alkyl groups of 1 to 10 carbon atoms represented by $R_5$ include n-heptyl, 1-methylpentyl, 2-methylhexyl, n-octyl, n-nonyl, n-decyl and the like as well as the above-exemplified alkyl groups. Examples of the alkoxy groups of 1 to 10 carbon atoms represented by $R_3$ and $R_4$ are straight- or branched-chain alkoxy groups such as methoxy, ethoxy, n-propoxy, isopropoxy, n-butoxy, isobutoxy, sec-butoxy, tert-butoxy, n-pentoxy, isopentoxy, n-hexyloxy, isohexyloxy, n-octyloxy and the like. In the compound of the formula (I), n is an integer of 1 to 100, preferably an integer of 1 to 10. When n is an integer of 2 or more, the groups $R_3$ may be the same as or different from each other and the groups $R_4$ may be the same as or different from each other.

Of the compounds of the formula (I) according to the invention, the compounds wherein A is a group

include, for example, γ-acryloxyethyl trimethoxysilane, γ-methacryloxyethyl trimethoxysilane, γ-acryloxypropyl trimethoxysilane, γ-methacryloxypropyl trimethoxysilane, γ-acryloxypropyl triethoxysilane, γ-methacryloxypropyl triethoxysilane, γ-acryloxypropyl tripropoxysilane, γ-methacryloxypropyl tripropoxysilane, γ-acryloxypropyl methyldimethoxysilane, γ-methacryloxypropyl methyldimethoxysilane, γ-acryloxypropyl methyldiethoxysilane, γ-methacryloxypropyl methyldiethoxysilane, γ-acryloxypropyl methyldipropoxysilane, γ-methacryloxypropyl methyldipropoxysilane, γ-acryloxybutyl phenyldimethoxysilane, γ-methacryloxybutyl phenyldimethoxysilane, γ-acryloxybutyl phenyldiethoxysilane, γ-methacryloxybutyl phenyldiethoxysilane, γ-acryloxybutyl phenyldipropoxysilane, γ-methacryloxybutyl phenyldipropoxysilane, γ-acryloxypropyl dimethylmethoxysilane, γ-methacryloxypropyl dimethylmethoxysilane, γ-acryloxypropyl dimethylethoxysilane, γ-methacryloxypropyl dimethylethoxysilane, γ-acryloxypropyl diphenylmethylmethoxysilane, γ-methacryloxypropyl diphenylmethylmethoxysilane, γ-acryloxypropyl diphenylmethylethoxysilane, γ-methacryloxypropyl diphenylmethylethoxysilane,

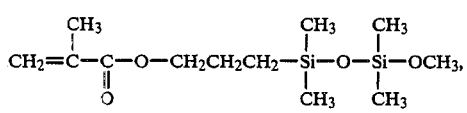

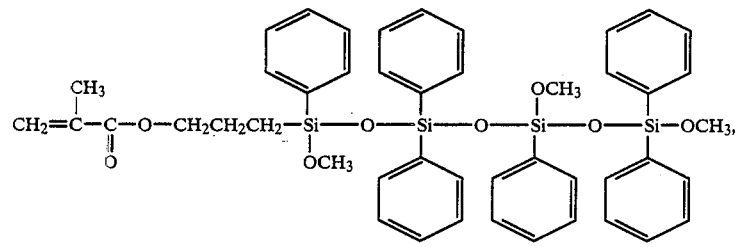

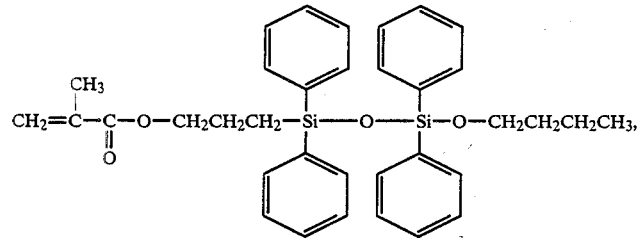

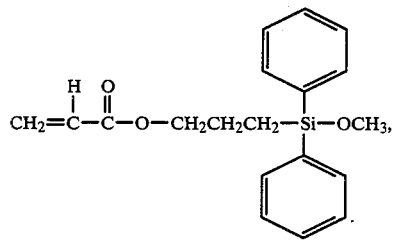

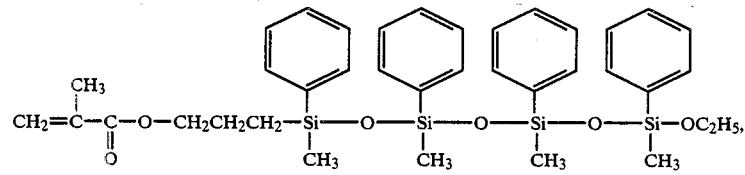

-continued

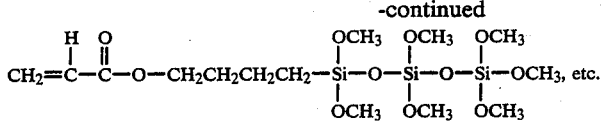

Of the compounds of the formula (I), the compounds wherein A is

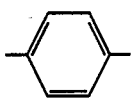

include, for example,

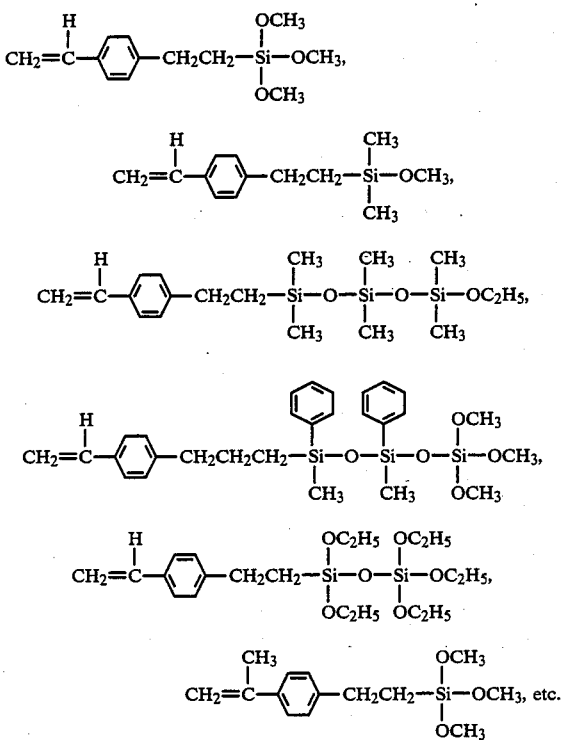

Among the compounds of the formula (I), it is preferable to use, in view of radical copolymerizability, storage stability and the like, acryloxypropyl trimethoxysilane, methacryloxypropyl trimethoxysilane, methacryloxypropyl triethoxysilane, methacryloxypropyl tri-n-butoxysilane, acryloxypropyl methyldimethoxysilane, methacryloxypropyl methyldimethoxysilane, methacryloxypropyl methyldi-n-butoxysilane, etc.

The carboxyl group-containing unsaturated monomer, which is the other essential monomer of the copolymer used as the dispersion stabilizer resin, serves to give the coplymer a dispersibility in water and also acts as a catalyst for curing the coating film.

Preferred examples of the carboxyl group-containing unsaturated monomer are α,β-ethylenically unsaturated carboxylic acids such as acrylic acid, methacrylic acid, crotonic acid, maleic acid, maleic anhydride, itaconic acid, itaconic anhydride, fumaric acid, citraconic acid and the like among which acrylic or methacrylic acid is preferred in view of radical copolymerizability and dispersibility in water.

The copolymer to be used as the dispersion stabilizer resin in the invention is prepared by copolymerizing at least one of alkoxysilane group-containing vinyl monomers represented by the formula (I) and at least one of carboxyl group-containing unsaturated monomers both as the essential monomers, together with other polymerizable monomer (B) copolymerizable with these essential monomers.

The type of other polymerizable monomer (B) is not specifically limited insofar as the monomer (B) is a compound copolymerizable with the alkoxysilane group-containing vinyl monomer of the formula (I) and the carboxyl group-containing unsaturated monomer. The polymerizable monomer (B) can be suitably selected according to the properties required of the film. Preferred polymerizable monomers (B) are radically polymerizable unsaturated monomers which include, for example: $C_1$–$C_{18}$ alkyl esters or $C_1$–$C_{18}$ cycloalkyl esters of acrylic or methacrylic acids such as methyl acrylate or methacrylate, ethyl acrylate or methacrylate, propyl acrylate or methacrylate, n-butyl acrylate or methacrylate, isobutyl acrylate or methacrylate, tert-butyl acrylate or methacrylate, 2-ethylhexyl acrylate or methacrylate, cyclohexyl acrylate or methacrylate, n-octyl acrylate or methacrylate, lauryl acrylate or methacrylate, tridecyl acrylate or methacrylate, stearyl acrylate or methacrylate and the like; alkoxyalkyl esters of acrylic or methacrylic acids such as methoxybutyl acrylate or methacrylate, methoxyethyl acrylate or methacrylate, ethoxybutyl acrylate or methacrylate and the like; hydroxyalkyl esters of acrylic or methacrylic acids such as 2-hydroxyethyl acrylate or methacrylate, 2-hydroxypropyl acrylate or methacrylate, hydroxybutyl acrylate or methacrylate and the like; esters of aromatic alcohol with acrylic or methacrylic acid such as benzyl acrylate or methacrylate; addition products of glycidyl acrylate, glycidyl methacrylate or hydroxyalkyl ester of acrylic acid or methacrylic acid with $C_2$–$C_{18}$ monocarboxylic acid compound such as acetic acid, propionic acid, capric acid, lauric acid, linoleic acid, oleic acid, p-tert-butyl benzoic acid or the like; addition products of acrylic or methacrylic acid with "Cardula E10" (trademark, product of Shell Chemical Co., Ltd., U.S.A.) or like monoepoxy compounds; vinyl aromatic compounds such as styrene, α-methylstyrene, vinyltoluene, p-chlorostyrene, p-tert-butylstyrene and the like; mono- or di-esters of α,β-unsaturated carboxylic acids other than acrylic or methacrylic acids such as itaconic acid, itaconic anhydride, crotonic acid, maleic acid, maleic anhydride, fumaric acid, citraconic acid or the like with mono-alcohol having 1 to 18 carbon atoms such as methyl alcohol, butyl alcohol, hexyl alcohol, stearyl alcohol or the like; "Viscoat 8F", "Viscoat 8FM", 37 Viscoat 3F", "Viscoat 3FM" (trademarks, products of Osaka Organic Chemicals Company Limited, Japan, acrylates or methacrylates having fluorine atom at the side chain); fluorine-containing compounds such as perfluorocyclohexyl acrylate or methacrylate, perfluorohexyl ethylene and the like; vinyl esters such as vinyl acetate, vinyl benzoate, "Veoba" (trade name, product of Shell Chemical Co., Ltd., U.S.A.) and the like; vinyl ethers such as n-butyl vinyl ether, ethyl vinyl ether, methyl vinyl ether and the like; and α-olefin type compounds such as ethylene, propylene, vinyl chloride, vinylidene chloride and the like.

The amounts of these three kinds of monomers can be determined over a wide range, but suitable amounts are in the following range. The amount of the monomer of the formula (I) is about 1 to about 90% by weight, preferably about 5 to about 50% by weight, based on the total amount of the monomers. If less than about 1% by weight of this monomer is used, the aqueous dispersion has a reduced curability and the resulting film is lower in impact resistance, water resistance, weatherability and the like. If more than about 90% by weight of this monomer is used, the nonaqueous dispersion exhibits a deteriorated storage stability. Consequently the use of this monomer outside said proportion range is undesirable. The amount of the carboxyl group-containing unsaturated monomer is about 1 to about 25% by weight, preferably about 2 to about 20% by weight, based on the total amount of the monomers. Less than about 1% by weight of this monomer used results in difficulty in dissolving or dispersing the dispersion stabilizer resin in water, whereas more than about 25% by weight of this monomer used tends to impair the water resistance and the weatherability of the film produced from the aqueous dispersion. Thus the use of this monomer outside said proportion range is undesirable. The amount of the other polymerizable monomer (B) is suitably determined according to the required coating film properties and is usually in the range of about 9 to about 98% by weight, preferably about 30 to about 93% by weight, based on the total amount of the monomers.

The copolymerization for production of a dispersion stabilizer resin is carried out usually using a radical polymerization initiator. Usable radical polymerization initiators include, for example, azo-type initiators such as 2,2'-azobisisobutyronitrile, 2,2'-azobis(2,4-dimethylvaleronitrile) and the like, and peroxide-type initiators such as benzoyl peroxide, lauryl peroxide, tert-butyl peroctoate, tert-butylperoxy-2-ethylhexanoate and the like. The amount of the polymerization initiator used is about 0.2 to about 10 parts by weight, preferably about 0.5 to about 5 parts by weight, per 100 parts by weight of the monomers to be copolymerized. The copolymerization is conducted at a temperature of about 60° to about 160° C. The reaction can be completed usually in about 1 to about 15 hours.

It is suitable that the copolymer used as the dispersion stabilizer resin have a number-average molecular weight of about 1,000 to about 60,000 (about 5,000 to about 100,000 in weight-average molecular weight), preferably about 1,000 to about 30,000. The copolymer outside said molecular weight range is undesirable because the copolymer of less than about 1,000 in molecular weight is apt to aggregate and precipitate the dispersed particles due to insufficient stablization of dispersed particles, whereas the copolymer of more than about 60,000 in molecular weight is liable to significantly thicken the dispersion, rendering it difficult to handle.

The dispersion stablizer resin of the invention may be used singly or in combination with two or more such resins which are different from each other in composition and molecular weight. Further when required, the dispersion stablizer resin can be used conjointly with a small amount of other dispersion stabilizer such as butyletherified melamine-formaldehyde resin, alkyd resin, usual acryl resin free of the compound of the formula (I) as the copolymer component or the like. The amount of the other dispersion stablizer is 30% by weight or less based on the total amount of the dispersion stabilizer resins.

According to the present invention, the nonaqueous dispersion of polymer particles insoluble in an organic solvent is formed by polymerizing the radically polymerizable unsaturated monomer (A) in the presence of said dispersion stabilizer resin in the organic solvent.

The organic solvents useful in said polymerization include those which substantially do not dissolve the polymer particles produced by the polymerization but which dissolves well the dispersion stabilizer resin and the radically polymerizable unsaturated monomer (A). Examples of such organic solvents are aliphatic hydrocarbons such as hexane, heptane, octane and the like; aromatic hydrocarbons such as benzene, toluene, xylene and the like; alcohols such as methyl alcohol, isopropyl alcohol, n-butyl alcohol, isobutyl alcohol, octyl alcohol and the like; ethers such as ethyl cellosolve, butyl cellosolve, diethylene glycol monobutyl ether and the like; ketones such as methyl isobutyl ketone, diisobutyl ketone, methyl ethyl ketone, methyl hexyl ketone, ethyl butyl ketone and the like; and esters such as ethyl acetate, isobutyl acetate, amyl acetate, 2-ethylhexyl acetate and the like. These organic solvents are usable singly or at least two of them can be used in mixture.

Useful radically polymerizable unsaturated monomers (A) to be polymerized in the organic solvent in the presence of the dispersion stabilizer resin include cyano group-containing unsaturated compounds such as acrylonitrile or methacrylonitrile as well as the above-exemplified polymerizable monomers (B).

Of said radically polymerizable unsaturated monomers (A), preferable is a mixture of two or more radically polymerizable unsaturated monomers which are less than or equal to the monomer component for the dispersion stabilizer resin in the number of carbon atoms. The use of such radically polymerizable unsaturated monomers leads to the formation of stable polymer particles. Preferable to use for this purpose are esters of acrylic or methacrylic acids having 8 or less carbon atoms, preferably 4 or less carbon atoms, vinyl aromatic compounds, acrylonitriles, methacrylonitrile and the like.

These radically polymerizable unsaturated monomers (A) are usable singly or at least two of them can be used in mixture.

The polymerization of said radically polymerizable monomer (A) is carried out usually using a radical polymerization initiator. Usable radical polymerization initiators are, for example, azo-type initiators such as 2,2'-azobisisobutyronitrile, 2,2'-azobis(2,4-dimethylvaleronitrile) and the like, and peroxide-type initiators such as benzoyl peroxide, lauryl peroxide, tert-butyl peroctoate, tert-butylperoxy-2-ethylhexanoate and the like. The polymerization initiator is used in an amount of about 0.2 to about 10 parts by weight, preferably about 0.5 to about 5 parts by weight, per 100 parts by weight of the monomer to be polymerized.

The amount of the dispersion stabilizer resin to be used for polymerization is widely variable depending on the requirements for the particle size of the polymer particles in the aqueous dispersion, coating film appearance, coating film properties and the like. Generally a suitable amount is about 5 to about 1,000 parts by weight, preferably about 10 to about 500 parts by weight, per 100 parts of the monomer to be polymerized. A suitable total concentration of dispersion stabilizer resin and radically polymerizable monomer (A) in the organic solvent is in the range of about 30 to about 70% by weight, preferably about 30 to about 60% by weight.

The polymerization can be conducted by conventional methods. The temperature for polymerization reaction is about 60° to about 160° C. The reaction can be completed usually in about 1 to about 15 hours.

In the stable nonaqueous dispersion prepared in this way, the polymer particles obtained by the polymerization of radically polymerizable unsaturated monomer (A) are dispersed in a liquid phase having the dispersion stabilizer resin dissolved in the organic solvent. The polymer particles have a particle size of about 0.02 to about 1.0 μm. The use of polymer particles with a particle size less than in said range tends to increase the viscosity of varnish, whereas the polymer particles of greater particle size are likely to swell or aggregate during storage. Consequently the use of polymer particles outside said particle size range is undesirable. The particle size of polymer particles can be freely controlled within said range by varying the amount of dispersion stabilizer resin within the range described hereinbefore. More specifically, the increase of amount can diminish the particle size and the decrease thereof can augment the particle size.

According to the present invention, the storage stability of the dispersion and the mechanical characteristics of coating film can be further improved by causing the dispersion stabilizer resin to bind to the polymer particles in the nonaqueous dispersion. In the case of binding, the polymer particles in the dispersion show substantially no change in the apparent dispersed state and retains the particle size in said range.

The dispersion stabilizer resin can be bound to the polymer particles, for example, by preparing the dispersion stabilizer resin using as a portion of the monomer components a monomer having functional group such as hydroxyl group, acid group, acid anhydride group, epoxy group, methylol group, isocyanate group, amido group, amino group or the like and further by use as a monomer for forming the polymer particles a monomer having functional group reactive with the functional group of dispersion stabilizer resin, examples of such functional group being hydroxyl group, acid group, acid anhydride group, epoxy group, methylol group, isocyanate group, amido group, amino group, silanol group, alkoxysilane group or the like. Useful combinations of the monomer (B) as the monomer component of dispersion stabilizer resin and the monomer (A) for polymer particles are, for example, the combinations of monomers containing respectively: isocyanate group and hydroxyl group; isocyanate group and methylol group; epoxy group and acid (acid anhydride) group; epoxy group and amino group; isocyanate group and amido group; acid (acid anhydride) group and hydroxyl group; hydroxyl group and silanol or alkoxysilane group; etc.

Examples of monomers having such functional groups are hydroxyalkyl esters of acrylic or methacrylic acids such as 2-hydroxyethyl acrylate or methacrylate, 2-hydroxypropyl acrylate or methacrylate, hyroxybutyl acrylate or methacrylate and the like; $\alpha,\beta$-ethylenically unsaturated carboxylic acids such as acrylic or methacrylic acid, crotonic acid, maleic acid, maleic anhydride, itaconic acid, itaconic anhydride, fumaric acid, citraconic acid and the like; glycidyl-group containing compounds such as glycidyl acrylate or methacrylate, vinyl glycidyl ether, allyl glycidyl ether and the like; carboxylic acid amide compounds such as acrylamide or methacrylamide, N,N-dimethyl acrylamide or methacrylamide, N-alkoxymethylated acrylamide or methacrylamide, diacetone acrylamide, N-methylol acrylamide or methacrylamide and the like; sulfonic acid amido group-containing compounds such as p-styrene sulfonamide, N-methyl-p-styrene sulfonamide, N,N-dimethyl-p-styrene sulfonamide and the like; amino group-containing compounds such as tert-butylaminoethyl acrylate or methacrylate and the like; phosphoric acid group-containing compounds such as a condensate of 2-hydroxyethyl acrylate or methacrylate with phosphoric acid or ester of phosphoric acid, addition product of a glycidyl group-containing compound such as glycidyl acrylate or methacrylate with phosphoric acid or ester of phosphoric acid and the like; sulfonic acid group-containing compounds such as 2-acrylamide-2-methylpropanesulfonic acid and the like; addition products of m-isopropenyl-$\alpha,\alpha$-dimethylbenzyl isocyanate, isophorone diisocyanate or tolylene diisocyanate with hydroxy acrylate or methacrylate in equimolar amounts; isocyanate group-containing compound such as isocyanoethyl methacrylate, etc.

Alternatively the dispersion stabilizer resin can be bound to the polymer particles also by polymerizing the radically polymerizable unsaturated monomer (A) in the presence of the dispersion stablizer resin having polymerizable double bond. The polymerizable double bond can be introduced into the dispersion stabilizer resin, for example, by using, as a copolymerizable monomer for production of dispersion stabilizer resin, a carboxylic acid, phosphoric acid, sulfonic acid or like acid group-containing monomer to incorporate the acid group into the dispersion stabilizer resin and reacting the acid group with a glycidyl group-containing unsaturated monomer such as glycidyl acrylate or methacrylate, acryl glycidyl ether, or, of course, conversely by incorporating glycidyl group into the dispersion stabilizer resin to react the dispersion stabilizer resin with an acid group-containing unsaturated monomer. These reactions can be conducted under conventional conditions.

A further method of binding the dispersion stabilizer resin to the polymer particles is to produce a nonaqueous dispersion containing the dispersion stabilizer resin and polymer particles each incorporating therein functional groups nonreactive with each other and then to add to the nonaqueous dispersion a binder for binding both functional groups. Stated more specifically, for example a hydroxyl group-containing unsaturated monomer alone or in mixture with other unsaturated monomer is polymerized in the presence of a hydroxyl group-containing dispersion stabilizer resin in an organic solvent to obtain a nonaqueous dispersion containing the dispersion stabilizer resin and the dispersed particles each having hydroxyl group incorporated therein after which a polyisocyanate compound or the like is added to the nonaqueous dispersion for reaction to proceed at room temperature for several days or at about 60° to about 100° C. for about 1 to about 5 hours so that the dispersion stabilizer resin can be bound to the dispersed particles. Useful polyisocyanate compounds can be any of those containing at least two isocyanate groups in the molecule such as tolylene diisocyanate, xylylene diisocyanate, 4,4'-diphenylmethane diisocyanate and like aromatic diisocyanates or hydrides thereof; hexamethylene diisocyanate, lysine diisocyanate, dimer acid (dimer of tall oil fatty acid) diisocyanate and like aliphatic diisocyanates; and isophorone diisocyanate and like alicyclic diisocyanates. Other useful combinations are, for example, a combination of polyepoxide with a dispersion stabilizer resin and polymer particles each containing acid group, a combination of polycarboxylic acid with a dispersion stabilizer resin and polymer particles each containing epoxy group, a combination of a polysulfide compound with a dispersion stabilizer resin and polymer particles each containing epoxy group or isocyanate group, etc. Exemplary of useful polyepoxides are bisphenol A-type epoxy resin, bisphenol F-type epoxy resin, novolak-type epoxy resin, epoxy group-containing acrylic resin and the like. Illustrative of useful polycarboxylic acids are adipic acid, cebacic acid, azelaic acid, isophthalic acid and the like. Representative of useful polysulfides are pentamethylene disulfide, hexamethylene disulfide, poly (ethylene disulfide) and the like.

By the foregoing methods, the dispersion stabilizer resin and polymer particles can be chemically bound together. The functional group or double bond is introduced into the dispersion stabilizer resin and/or polymer particles in such an amount that the average number thereof is at least 0.1 per molecule of the resin and/or polymer particles.

According to the invention, the storage stability of the aqueous dispersion can be further improved by using specific radically polymerizable unsaturated monomer to be polymerized in the organic solvent in the presence of the dispersion stablizer resin to cause crosslinking within the polymer particles, said specific monomers being a polyvinyl monomer or a combination of monomers containing functional group such as epoxy group, acid (acid anhydride) group, isocyanate group, amido group, amino group, silanol group, alkoxysilane group, hydroxyl group or the like. Useful monomers containing such functional groups include the same monomers as used for binding the dispersion stabilizer resin and polymer particles, and the alkoxysilane group-containing vinyl monomers of the formula (I) or silanol group-containing vinyl monomers prepared by hydrolyzing the monomer of the formula (I). Useful combinations of monomers are, for example, combinations of those containing respectively: epoxy group-acid (acid anhydride) group, epoxy group-amino group, epoxy group-amido group, isocyanate group-hydroxyl group, silanol or alkoxysilane group-hydroxyl group, etc. Exemplary of polyvinyl monomers are diacrylate or dimethacrylate of 1,6-hexanediol, triacrylate or trimethacrylate of trimethylolpropane, divinylbenzene, etc.

In the process of the invention, the nonaqueous dispersion obtained above is converted into an aqueous one. The conversion can be performed by adding water to the nonaqueous dispersion neutralized with a basic substance or adding the neutralized nonaqueous dispersion to water.

Examples of basic substances useful for neutralization of the nonaqueous dispersion are ammonia, methylamine, dimethylamine, trimethylamine, ethylamine, diethylamine, triethylamine, dimethylethanolamine, diethylethanolamine, diethanolamine, triethanolamine and the like. Of these basic substances, ammonia and triethylamine are preferable to use because they are unlikely to remain in the film formed by drying the aqueous dispersion at room temperature and therefore they can be used without impairing the coating film properties, and because they are of low toxicity. The basic substance is used in an amount of about 0.1 to about 1.5 equivalents, preferably about 0.2 to about 1.0 equivalent, per equivalent of free carboxyl group contained in the nonaqueous dispersion. Less than about 0.1 equivalent of the basic substance used entails difficulty in stably dispersing the polymer particles in water or deteriorates the storage stability of aqueous dispersion even if the polymer particles can be dispersed therein, whereas more than about 1.5 equivalents of basic substance used results in excessive amount of free basic substance which impairs the storage stability of aqueous dispersion. Thus it is undesirable to use the basic substance outside said proportion range.

Water is added to the neutralized nonaqueous dispersion in the following manner. A neutralizing agent is added to the nonaqueous dispersion with stirring over a short time period to achieve neutralization. Then the addition of water is effected for a short time until occurrence of phase conversion from oil phase to aqueous phase. After phase conversion, the remaining water portion is gradually added dropwise to the required solids concentration to give an aqueous dispersion. On addition of neutralizing agent to the nonaqueous dispersion, the hydrolysis and condensation reaction of the alkoxysilane group in the dispersion stabilizer resin so rapidly proceed in the presence of an acid and a basic substance that the neutralization of nonaqueous dispersion and addition of water need to be completed in a short time to avoid the viscosity increase and gelation of the system. The time taken from addition of neutralizing agent until completion of addition of water in the amount sufficient to produce the phase conversion is variable depending on the type of reactor, stirring conditions and atmospheric temperature, but is usually less than 24 hours, preferably less than 10 hours.

In the case the neutralized nonaqueous dispersion is added to water, a neutralizing agent is added for a short time to the nonaqueous dispersion being stirred to afford a neutralized dispersion which is then gradually added to water with stirring to give an aqueous dispersion. In this case, the conversion must be completed also in the shortest possible time, as in the addition of water to neutralized dispersion, in view of the likelihood for the viscosity increase and gelation to occur before addition of neutralized dispersion to water. The time required from addition of neutralizing agent until completion of addition of neutralized dispersion to water is usually less than 24 hours, preferably less than 10 hours.

The conversion to aqueous dispersion can be performed also by adding water to the nonaqueous dispersion before its neutralization to obtain an aqueous dispersion which is then neutralized with a basic substance for stabilization. More specifically, water is added to the nonaqueous dispersion with stirring until dilution to the required solids concentration and a neutralizing agent is added to give an aqueous dispersion. In this method, the water portion added to the nonaqueous dispersion is permeated into the dispersion stabilizer resin, and the carboxyl group acts as a catalyst to hydrolyze the alkoxysilane group with water, forming a silanol group. Upon subsequent addition of water, said silanol group having a markedly hydrophilic property gives a hydrogen bond with water to bring about hydration, whereby an aqueous dispersion is produced. The aqueous dispersion thus obtained has a relatively great number of hydrated silanol groups in the interface between the water as the dispersing medium and the dispersion stabilizer resin present on the surface of polymer particles. With this structure, the aqueous dispersion retains the polymer particles stably dispersed in water. This method is desirable in that the basic substance is added after the formation of aqueous dispersion, the basic substance acting also as a hydrolyzing catalyst and serving to accelerate the crosslinking, whereby the viscosity increase and gelation of the system is prevented. The method is advantageous particularly in preparing an aqueous dispersion at a high concentration and further favorable in forming an aqueous dispersion which, when applied for coating, exhibits high crosslinkability because of a relatively great number of silanol groups present on the surface of dispersed particles.

The nonaqueous dispersion is converted to an aqueous one at a temperature of about 1 to about 90° C., preferably about 5 to about 40° C. The conversion at a temperature outside this range is undesirable because the conversion at lower than about 1° C. increases the viscosity and particle size, whereas the conversion at higher than about 90° C. is prone to rapid hydrolysis of alkoxysilane groups, forming silanol groups which react with each other to thicken and gel the system.

When required, the organic solvent in the aqueous dispersion prepared by the process of the present invention can be distilled off under reduced pressure to reduce the content of organic solvent in the dispersion to less than about 10% by weight based on the weight of the water in the dispersion, whereby the aqueous dispersion is rendered further beneficial in terms of storage stability and mitigation of pollution problems.

It is suitable to adjust the solids concentration of the aqueous dispersion in the invention to about 1 to about 70% by weight, preferably about 5 to about 40% by weight. The solids concentration of less than about 1% by weight is economically disadvantageous in formation of a thick film, whereas the solids concentration of higher than about 70% by weight is likely to aggregate and precipitate the polymer particles and tends to thicken and gel the system owing to the reaction between dispersion stabilizer resins. Thus it is undesirable to use the aqueous dispersion having a solids concentration outside said range. The polymer particles in the aqueous dispersion has a particle size of about 0.02 to about 1.0 μm which is substantially the same as those in the nonaqueous dispersion.

The aqueous dispersion thus obtained can be suitably used in applications, for example, as coating compositions, adhesives, inks, materials for molded products, fillers, impregnants or leveling agents for fibrous materials and paper, etc.

While the aqueous dispersion prepared according to the invention can be used as it is, the dispersion may contain, when required, an extender pigment, coloring agent, dye, plasticizer, curing agent, curing catalyst, ultraviolet absorber, oxidation inhibitor, fungicide, bactericide and the like. Useful plasticizers can be any of suitable conventional types including dimethylphthalate, dioctylphthalate and like low-molecular-weight plasticizers, vinyl polymer-type plasticizers, polyester-type plasticizers and like high-molecular-weight plasticizers, etc. The plasticizer may be incorporated in the nonaqueous dispersion or may be dissolved in the radically polymerizable unsaturated monomer (A) in preparation of nonaqueous dispersion so that it is present in the polymer particles dispersed in the nonaqueous dispersion. Useful curing agents include water-soluble or water-dispersible amino resins, epoxy resins and like crosslinking agents, etc. Useful curing catalysts are, for example, p-toluenesulfonic acid, phosphoric acid and like acidic compounds, tin octylate, dibutyltin diacetate and like tin-containing compounds, butylamine, triethylamine and like basic compounds, etc.

In use as a coating composition, the aqueous dispersion prepared by the process of the invention can be applied to substrates by various coating means such as brushing, spraying, roller coating, immersion or the like. A suitable amount of aqueous dispersion used for coating is in the range sufficient to form a film of about 1 to about 1,000 μm thickness. The coating film can be dried at room temperature but, when required, may be thermally dried at a temperature of about 200° C. or lower.

The aqueous dispersion prepared by the process of the invention has an excellent storage stability even at a high concentration and gives films outstanding in appearance, water resistance, weatherability and mechanical characteristics.

The present invention will be described below in more detail with reference to the following examples and comparison examples in which the parts and percentages are all by weight unless otherwise specified.

EXAMPLE 1

(1) Synthesis of Dispersion Stabilizer Resin

Into a flask was placed 100 parts of isopropyl alcohol, and then the following monomers and polymerization initiator were added dropwise with refluxing over a period of 3 hours. After addition, the mixture was aged for 2 hours.

| | |
|---|---|
| γ-Methacryloxypropyl trimethoxysilane | 20 parts |
| Methyl methacrylate | 27 parts |
| 2-Hydroxyethyl methacrylate | 50 parts |
| Acrylic acid | 3 parts |
| Azobisisobutyronitrile | 5 parts |

The thus obtained solution was transparent and was found to have a nonvolatile content of 50% and a viscosity of V (Gardner, 25° C.) and to contain the polymer with a number-average molecular weight of about 7,000 and an acid value of 24.

(2) Synthesis of Aqueous Dispersion

A mixture of 86 parts of the dispersion stabilizer resin solution obtained above and 100 parts of isopropyl alcohol was maintained at a temperature for refluxing isopropyl alcohol. To the mixture were added dropwise the following monomers and polymerization initiator over a period of 5 hours. After addition, the mixture was aged for 2 hours.

| | |
|---|---|
| Acrylonitrile | 73 parts |
| Methyl methacrylate | 15 parts |
| 2-Hydroxyethyl methacrylate | 10 parts |
| Methacrylic acid | 2 parts |
| 2,2'-Azobisisobutyronitrile | 2 parts |

The nonaqueous dispersion thus obtained was semi-translucent. The dispersion was cooled to 30° C. or less and 214 parts of water was added. The mixture was neutralized with 0.7 equivalent of triethylamine for conversion to aqueous dispersion. The isopropyl alcohol was distilled off under reduced pressure, giving a semitranslucent aqueous dispersion free of organic solvent. The aqueous dispersion was left to stand for 2 weeks but no sedimentation occurred. The aqueous dispersion was found to have a nonvolatile content of 41% and a viscosity of N (Gardner, 25° C.).

EXAMPLE 2

(1) Synthesis of Dispersion Stabilizer Resin

Into a flask was placed 100 parts of isobutyl acetate, and the following monomers and polymerization initiator were added dropwise with refluxing over a period of 3 hours. After addition, the mixture was aged for 2 hours.

| | |
|---|---|
| γ-Methacryloxypropyl methyldimethoxysilane | 5 parts |
| Ethyl methacrylate | 25 parts |
| 2-Hydroxyethyl acrylate | 40 parts |
| Acrylic acid | 8 parts |
| Methyl methacrylate | 10 parts |
| N—methylol acrylamide | 10 parts |
| Styrene | 2 parts |
| 2,2'-Azobisisobutyronitrile | 1.25 parts |

The thus obtained solution was transparent and was found to have a nonvolatile content of 50% and a viscosity of $Z_3$ (Gardner, 25° C.) and to contain the polymer with a number-average molecular weight of about 15,000 and an acid value of 64. This dispersion stabilizer resin solution is hereinafter referred to as "Dispersion Stabilizer A".

(2) Synthesis of Dispersion Stabilizer Resin

| | |
|---|---|
| Glycidyl methacrylate | 0.7 part |
| Dispersion Stabilizer A | 100 parts |
| p-Tert-butylcatechol | 0.01 part |
| Dimethylaminoethanol | 0.05 part |

These components were reacted at 80° C. to introduce an active double bond which is about 0.7 in number per molecule. The thus obtained dispersion stabilizer resin was found to have an acid value of 61. This dispersion stabilizer resin solution is hereinafter referred to as "Dispersion Stabilizer B".

(3) Synthesis of Aqueous Dispersion

A mixture of 21.5 parts of Dispersion Stabilizer A, 21.5 parts of Dispersion Stabilizer B and 100 parts of ethyl alcohol was maintained at a temperature for refluxing ethyl alcohol. To the mixture were added dropwise the following monomers and polymerization initiator over a period of 5 hours. After addition, the mixture was aged for 2 hours.

| | |
|---|---|
| γ-Methacryloxypropyl trimethoxysilane | 10 parts |
| Acrylonitrile | 25 parts |
| Methyl methacrylate | 30 parts |
| Styrene | 10 parts |
| 2-Hydroxyethyl methacrylate | 10 parts |
| Methacrylic acid | 5 parts |
| Glycidyl methacrylate | 10 parts |
| 2,2'-Azobisisobutyronitrile | 2 parts |

In this way, a semitranslucent nonaqueous dispersion was obtained. The dispersion was converted to an aqueous dispersion in the same manner as in Example 1. The ethyl alcohol and isobutyl acetate were distilled off under reduced pressure, giving a semitranslucent aqueous dispersion. The aqueous dispersion exhibited a remarkable stability in standing at room temperature and was found to have a nonvolatile content of 39% and a viscosity of Q (Gardner, 25° C.).

EXAMPLE 3

(1) Synthesis of Dispersion Stabilizer Resin

Into a flask were placed 60 parts of toluene and 40 parts of butyl cellosolve. The following monomers and polymerization initiator were added dropwise with refluxing over a period of 4 hours. After addition, the mixture was aged for 3 hours.

| | |
|---|---|
| γ-Methacryloxypropyl triethoxysilane | 28 parts |
| 2-Hydroxypropyl methacrylate | 20 parts |
| Methacrylic acid | 13 parts |
| 2-Ethylhexyl methacrylate | 29 parts |
| 2,2'-Azobis(2,4-dimethylvaleronitrile) | 2.5 parts |

The thus obtained solution was transparent and was found to have a nonvolatile content of 50% and a viscosity of E (Gardner, 25° C.) and to contain the polymer with a number-average molecular weight of about 12,000 and an acid value of 86.

(2) Synthesis of Aqueous Dispersion

A mixture of 25 parts of dispersion stabilizer resin solution obtained above, 25 parts of Dispersion Stabilizer B, 90 parts of heptane and 10 parts of isopropyl alcohol was maintained at a temperature for refluxing heptane. To the mixture were added dropwise the following monomers and polymerization initiator over a period of 5 hours. After addition, the mixture was aged for 3 hours.

| | |
|---|---|
| Acrylonitrile | 20 parts |
| Ethyl acrylate | 40 parts |
| Styrene | 20 parts |
| 2-Hydroxyethyl methacrylate | 10 parts |
| Glycidyl methacrylate | 5 parts |
| Methacrylic acid | 5 parts |
| 2,2'-Azobis (2,4-dimethylvaleronitrile) | 5 parts |

In this way, a semitranslucent nonaqueous dispersion was obtained. The dispersion was cooled to 30° C. or lower and 207 parts of water was added. The mixture was neutralized with 0.7 equivalent of triethylamine with stirring over a period of 5 minutes for conversion to an aqueous dispersion. The heptane, isopropyl alcohol and toluene were distilled off under reduced pressure, giving a semitranslucent aqueous dispersion. The aqueous dispersion had a remarkable stability in standing at room temperature and was found to have a nonvolatile content of 38% and a viscosity of J (Gardner, 25° C.).

EXAMPLE 4

(1) Synthesis of Dispersion Stabilizer Resin

One hundred parts of methyl cellosolve was maintained at a refluxing temperature, and the following monomers and polymerization initiator were added dropwise over a period of 4 hours. After addition, the mixture was aged for 3 hours.

| | |
|---|---|
| γ-Methacryloxypropyl methyldiethoxysilane | 35 parts |

| | |
|---|---|
| Methacrylic acid | 20 parts |
| 2-Hydroxyethyl methacrylate | 5 parts |
| tert-Butyl methacrylate | 25 parts |
| Lauryl acrylate | 15 parts |
| 2,2'-Azobisisobutyronitrile | 2 parts |

The thus obtained solution was transparent and was found to have a nonvolatile content of 50% and a viscosity of R (Gardner, 25° C.) and to contain the polymer with a number-average molecular weight of about 13,000 and an acid value of 135.

(2) Synthesis of Aqueous Dispersion

A mixture of 36 parts of dispersion stabilizer resin solution obtained above, 50 parts of ethyl alcohol and 50 parts of heptane was maintained at a refluxing temperature. To the mixture were added dropwise the following monomers and polymerization initiator over a period of 5 hours. After addition, the mixture was aged for 4 hours.

| | |
|---|---|
| Acrylonitrile | 30 parts |
| Methyl methacrylate | 35 parts |
| γ-Methacryloxypropyl trimethoxysilane | 10 parts |
| Styrene | 25 parts |
| Benzoyl peroxide | 2 parts |

In this way, a semitranslucent nonaqueous dispersion was obtained. The dispersion was cooled to 30° C. or lower and 145 parts of water was added. The mixture was neutralized with 0.75 equivalent of triethylamine with stirring over a period of 5 minutes for conversion to an aqueous dispersion. The ethyl alcohol and heptane were distilled off under reduced pressure, giving a semitranslucent aqueous dispersion. The aqueous dispersion had a remarkable stability in standing at room temperature and was found to have a nonvolatile content of 42% and a viscosity of U (Gardner, 25° C.).

EXAMPLE 5

(1) Synthesis of Dispersion Stabilizer Resin

One hundred parts of isopropyl alcohol was maintained at a refluxing temperature, and the following monomers and polymerization initiator were added dropwise over a period of 4 hours. After addition, the mixture was aged for 3 hours.

| | |
|---|---|
| γ-Methacryloxypropyl trimethoxysilane | 28 parts |
| 2-Hydroxyethyl acrylate | 10 parts |
| 2-Ethylhexyl methacrylate | 30 parts |
| Acrylic acid | 12 parts |
| Lauryl acrylate | 20 parts |
| 2,2'-Azobisisobutyronitrile | 5 parts |

The thus obtained solution was transparent and was found to have a nonvolatile content of 50% and a viscosity of N (Gardner, 25° C.) and to contain the polymer with a number-average molecular weight of about 7,500 and an acid value of 100.

(2) Synthesis of Aqueous Dispersion

A mixture of 86 parts of dispersion stabilizer resin solution obtained above, 60 parts of ethyl alcohol, 30 parts of hexane and 10 parts of butyl cellosolve was maintained at a refluxing temperature. To the mixture were added dropwise the following monomers and polymerization initiator over a period of 5 hours. After addition, the mixture was aged for 4 hours.

| | |
|---|---|
| Acrylonitrile | 30 parts |
| γ-Methacryloxypropyl trimethoxysilane | 15 parts |
| Methyl methacrylate | 30 parts |
| Styrene | 20 parts |
| Methacrylic acid | 5 parts |
| 2,2'-Azobisisobutyronitrile | 2 parts |

In this way, a semitranslucent nonaqueous dispersion was obtained. The dispersion was cooled to 30° C. or lower and 214 parts of water was added. The mixture was neutralized with 1.0 equivalent of triethylamine with stirring over a period of 5 minutes for conversion to an aqueous dispersion. The ethyl alcohol, isopropyl alcohol and hexane were distilled off under reduced pressure, giving a semitranslucent aqueous dispersion. The aqueous dispersion had a remarkable stability in standing at room temperature and was found to have a nonvolatile content of 38% and a viscosity of P (Gardner, 25° C.).

EXAMPLE 6

A nonaqueous dispersion was prepared in the same manner as in Example 1 with the exception of using the same amount of

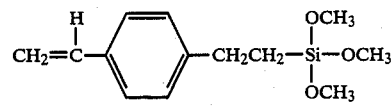

in place of the γ-methacryloxypropyl trimethoxysilane used in the synthesis of dispersion stabilizer resin in Example 1. A semitranslucent nonaqueous dispersion was obtained. The dispersion was cooled to 30° C. or lower and 214 parts of water was added. The mixture was neutralized with 0.7 equivalent of triethylamine with stirring over a period of 5 minutes for conversion to an aqueous dispersion. The isopropyl alcohol was distilled off under reduced pressure, giving a semitranslucent aqueous dispersion free of organic solvent. The aqueous dispersion caused no sedimentation even after 2 weeks of standing and was found to have a nonvolatile content of 40% and a viscosity of M (Gardner, 25° C.).

COMPARISON EXAMPLE 1

(1) Synthesis of Dispersion Stabilizer Resin

Into a flask was placed 100 parts of isopropyl alcohol, and the following monomers and polymerization initiator were added dropwise with refluxing over a period of 3 hours. After addition, the mixture was aged for 2 hours.

| | |
|---|---|
| 2-Hydroxyethyl methacrylate | 68 parts |
| Acrylic acid | 15 parts |
| Styrene | 17 parts |
| Benzoyl peroxide | 5 parts |

The thus obtained solution was transparent and was found to have a nonvolatile content of 50% and a viscosity of V (Gardner, 25° C.) and to contain the polymer with a number-average molecular weight of about 7,000.

(2) Synthesis of Aqueous Dispersion

A mixture of 86 parts of dispersion stabilizer resin solution obtained above and 100 parts of isopropyl alcohol was maintained at a temperature for refluxing isopropyl alcohol. To the mixture were added dropwise the following monomers and polymerization initiator over a period of 5 hours. After addition, the mixture was aged for 2 hours.

| | |
|---|---|
| Acrylonitrile | 73 parts |
| Methyl methacrylate | 15 parts |
| 2-Hydroxyethyl methacrylate | 10 parts |
| Methacrylic acid | 2 parts |
| 2,2'-Azobisisobutyronitrile | 2 parts |

In this way, a semitranslucent nonaqueous dispersion was obtained. The dispersion was neutralized with 1.0 equivalent of triethylamine and 214 parts of water was added. The isopropyl alcohol was distilled off under reduced pressure, giving a semitranslucent aqueous dispersion free of organic solvent. The dispersion was found to have a nonvolatile content of 41% and a viscosity of H (Gardner, 25° C.).

COMPARISON EXAMPLE 2

The dispersion stabilizer resin solution obtained in Example 1 was neutralized with 1.0 equivalent of triethylamine, 75 parts of water was added, and the isopropyl alcohol was distilled off under reduced pressure, giving an aqueous solution.

COMPARISON EXAMPLE 3

The same procedure as in Example 1 was carried out with the exception of not adding triethylamine and water, whereby a nonaqueous dispersion was prepared.

COMPARISON EXAMPLE 4

A neutralized nonaqueous dispersion was prepared in the same manner as in Example 1 with the exception of not adding water.

Performance Tests

The specimens of aqueous dispersion or nonaqueous dispersion obtained above in Examples and Comparison Examples were tested for properties by the following methods.

Gel fraction ratio:

The dispersion speciment was applied to a glass plate and the coated plate was dried at 30° C. for 7 days. The separated coating film was added to toluene maintained at a refluxing temperature and was subjected to extraction for 4 hours to determine the rate (%) of residual undissolved film portion.

Coating film properties:

Each specimen was applied to a polished mild steel plate to form a film of 50 μm thickness when dried and the coated plate was left to stand at 20° C. and a humidity of 75% for 7 days. Thereafter the coating film was tested for the following properties.

(i) State of coating surface: The coating film was visually inspected to check the coating film appearance for fault.

(ii) Water resistance: The coated plate was immersed in tap water at 40° C. for 168 hours and was inspected to check the state of coating surface.

(iii) Alkali resistance: The coated plate was immersed in a 10% aqueous solution of NaOH at 25° C. for 24 hours and was inspected to check the state of coating surface.

(iv) Acid resistance: The coated plate was immersed in a 5% aqueous solution of HCl at 25° C. for 24 hours and was inspected to check the state of coating surface.

(v) Weatherability: The coated plate was checked for weatherability with time by a sunshine weatherometer. The weatherability was evaluated in terms of the time (hr) taken until creation of fault such as gloss degradation, blistering and the like.

(vi) Impact resistance: A weight of 500 g was dropped onto the surface of coated sheet with use of a Du Pont impact tester. The impact resistance was evaluated in terms of the maximum height (cm) from which the weight was dropped but without any fault in coating film such as crack, peeling and the like.

Storage stability of aqueous dispersion:

The dispersion specimen was tested for storage stability in a hermetically closed thermostatic chamber at 30° C. The storage stability was evaluated in terms of the time taken until the specimen was brought into a pudding-like state.

Average particle size:

The average particle size was measured by a measuring instrument, "Coulter N-4" (tradename, product of Coulter Electronics Incorporation).

Flexibility:

The test was conducted with use of a flexing resistance tester (rod of 10 mm diameter) according to JIS K 5400.

Table 1 shows below the results.

TABLE 1

| | Example | | | | | |
|---|---|---|---|---|---|---|
| | 1 | 2 | 3 | 4 | 5 | 6 |
| Average particle size (μm) | 0.42 | 0.28 | 0.39 | 0.51 | 0.38 | 0.52 |
| Gel fraction ratio (%) | 90 | 92 | 95 | 90 | 95 | 92 |
| Storage stability | *6M< | 6M< | 6M< | 6M< | 6M< | 6M< |
| Coating film appearance | Good | Good | Good | Good | Good | Good |
| Impact resistance (cm) | 50< | 50< | 50< | 50< | 50< | 50< |
| Water resistance | No fault | No fault | No fault | No fault | No fault | No fault |
| Weatherability (hr) | 1000< | 1000< | 1000< | 1000< | 1000< | 1000< |
| Alkali resistance | No fault | No fault | No fault | No fault | No fault | No fault |
| Acid resistance | No fault | No fault | No fault | No fault | No fault | No fault |
| Flexibility | No fault | No fault | No fault | No fault | No fault | No fault |

| | Comparison Example | | | |
|---|---|---|---|---|
| | 1 | 2 | 3 | 4 |
| Average particle size (μm) | 0.49 | 0.01> | 0.39 | 0.40 |
| Gel fraction ratio (%) | 0 | 92 | 40 | 80 |
| Storage stability | More than 6 months | 1 month | 1 month | 7 hr |

TABLE 1-continued

| | | | | |
|---|---|---|---|---|
| Coating film apperarance | Good | Shrink | Good | Shrink |
| Impact resistance (cm) | Not measurable | 10 | 20 | 20 |
| Water resistance | Not measurable | Slightly blushing | Blushing, Blistering | Blushing, Blistering |
| Weatherability (hr) | Not measurable | 500 | 400 | 500 |
| Alkali resistance | Not measurable | Blistering | Blistering | Blistering |
| Acid resistance | Not measurable | Blistering | Blistering | Blistering |
| Flexibility | Not measurable | Crack | Crack | Crack |

(Note) *6M< = more than 6 months

I claim:

1. A process for preparing an aqueous dispersion, comprising the steps of (i) preparing a nonaqueous dispersion of polymer particles by polymerizing a radically polymerizable unsaturated monomer, (A) in an organic solvent, in which the polymer particles prepared from unsaturated monomer (A) are insoluble, in the presence of a dispersion stabilizer resin comprising a copolymer prepared by copolymerizing an alkoxysilane group-containing vinyl monomer represented by the formula

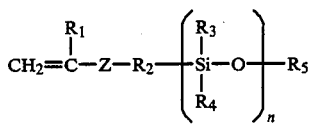   (I)

wherein Z is a group

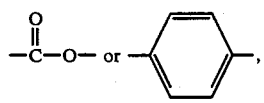

$R_1$ is a hydrogen atom or methyl group, $R_2$ is a straight- or branched-chain alkylene group having 1 to 6 carbon atoms, $R_3$ and $R_4$ are the same or different and each represent a phenyl group, straight- or branched-chain alkyl group having 1 to 6 carbon atoms or straight- or branched-chain alkoxy group having 1 to 10 carbon atoms, $R_5$ is a straight- or branched-chain alkyl group having 1 to 10 carbon atoms, and n is an integer of 1 to 10, with a carboxyl group-containing unsaturated monomer and a polymerizable monomer (B); the unsaturated monomer (A) being at least one monomer selected from the group consisting of $C_1$-$C_{18}$ alkyl esters or $C_1$-$C_{18}$ cycloalkyl esters of acrylic or methacrylic acids, alkoxyalkyl esters of acrylic or methacrylic acids, hydroxyalkyl esters of acrylic or methacrylic acids, esters of aromatic alcohol with acrylic or methacrylic acid, addition products of glycidyl acrylate, glycidyl methacrylate or hydroxyalkyl ester of acrylic or methacrylic acid with $C_2$-$C_{18}$ monocarboxylic acid compound, addition products of acrylic or methacrylic acid with monoepoxy compound, vinyl aromatic compounds, mono- or di-esters of α, β-unsaturated carboxylic acids with mono-alcohol having 1 to 18 carbon atoms, acrylates or methacrylates having fluorine atom at the side chain, fluorine-containing unsaturated compounds, vinyl esters, vinyl ethers, α-olefin type compounds and cyano group-containing unsaturated compounds, the carboxyl group-containing unsaturated monomer being at least one monomer selected from the group consisting of acrylic acid, methacrylic acid, crotonic acid, maleic acid, maleic anhydride, itaconic acid, itaconic anhydride, fumaric acid and citraconic acid, and the polymerizable monomer (B) being at least one monomer selected from the group consisting of $C_1$-$C_{18}$ alkl esters or $C_1$-$C_{18}$ cycloalkyl esters of acrylic or methacrylic acids, alkoxyalkyl esters of acrylic or methacrylic acids, hydroxyalkyl esters of acrylic or methacrylic acids, esters of aromatic alcohol with acrylic or methacrylic acid, addition products of glycidyl acrylate, glycidyl methacrylate or hydroxyalkyl ester of acrylic or methacrylic acid with $C_2$-$C_{18}$ monocarboxylic acid compound, addition products of acrylic or methacrylic acid with monoepoxy compound, vinyl aromatic compounds, mono- or di-esters of α, β-unsaturated carboxylic acids with mono-alcohol having 1 to 18 carbon atoms, acrylates or methacrylates having fluorine atom at the side chain, fluorine-containing unsaturated compounds, vinyl esters, vinyl ethers, α-olefin type compounds; and (ii) converting the nonaqueous dispersion to an aqueous dispersion.

2. A process according to claim 1 wherein the copolymer used as the dispersion stabilizer resin is one prepared from about 1 to about 90% by weight of the monomer of the formula (I), about 1 to about 25% by weight of the carboxyl group-containing unsaturated monomer and about 9 to about 98% by weight of the polymerizable monomer (B) based on the total amount of the monomers.

3. A process according to claim 2 wherein the copolymer used as the dispersion stabilizer resin is one prepared from about 5 to about 50% by weight of the monomer of the formula (I), about 2 to about 20% by weight of the carboxyl group-containing unsaturated monomer and about 30 to about 93% by weight of the polymerizable monomer (B) based on the total amount of the monomers.

4. A process according to claim 1 wherein the copolymer used as the dispersion stabilizer resin has a number-average molecular weight of about 1,000 to about 60,000.

5. A process according to claim 4 wherein the copolymer used as the dispersion stabilizer resin has a number-average molecular weight of about 1,000 to about 30,000.

6. A process according to claim 1 wherein the nonaqueous dispersion is converted to an aqueous one by neutralizing the nonaqueous dispersion with a basic substance in an amount of about 0.1 to about 1.5 equivalents per equivalent of the free carboxyl group contained in the nonaqueous dispersion, and adding water to the neutralized nonaqueous dispersion or adding the neutralized nonaqueous dispersion to water.

7. A process according to claim 1 wherein the nonaqueous dispersion is converted to an aqueous one by adding water to the nonaqueous dispersion to change the nonaqueous dispersion to an aqueous one, and adding a basic substance in an amount of about 0.1 to about 1.5 equivalents per equivalent of the free carboxyl group contained in the dispersion.

8. A process according to claim 1 wherein the aqueous dispersion has a solids concentration of about 1 to about 70% by weight.

9. A process according to claim 1 wherein the compound of formula (I) is at least one of γ-acryloxyethyl trimethoxysilane, γ-methacryloxyethyl trimethoxysilane, γ-acryloxypropyl trimethoxysilane, γ-methacryloxypropyl trimethoxysilane, γ-acryloxypropyl triethoxysilane, γ-methacryloxypropyl triethoxysilane, γ-acryloxypropyl tripropoxysilane, γ-methacryloxypropyl tripropoxysilane, γ-acryloxypropyl methyldimethoxysilane, γ-methacryloxyproply methyldimethoxysilane, γ-acryloxyproply methyldiethoxysilane, γ-methacryloxypropyl methyldiethoxysilane, γ-acryloxypropyl methyldipropoxysilane, γ-methacryloxypropyl methyldipropoxysilane, γ-acryloxybutyl phenyldimethoxysilane, γ-methacryloxybutyl phenyldimethoxysilane, γ-acryloxybutyl phenyldiethoxysilane, γ-methacryloxybutyl phenyldiethoxysilane, γ-acryloxybutyl phenyldipropoxysilane, γ-methacryloxybutyl phenyldipropoxysilane, γ-acryloxypropyl dimethylmethoxysilane, γ-methacryloxypropyl dimethylmethoxysilane, γ-acryloxypropyl dimethylethoxysilane, γ-methacryloxypropyl dimethylethoxysilane, γ-acryloxypropyl diphenylmethylmethoxysilane, γ-methacryloxypropyl diphenylmethylmethoxysilane γ-acryloxypropyl diphenylmethylethoxysilane, γ-methacryloxypropyl diphenylmethylethoxysilane,

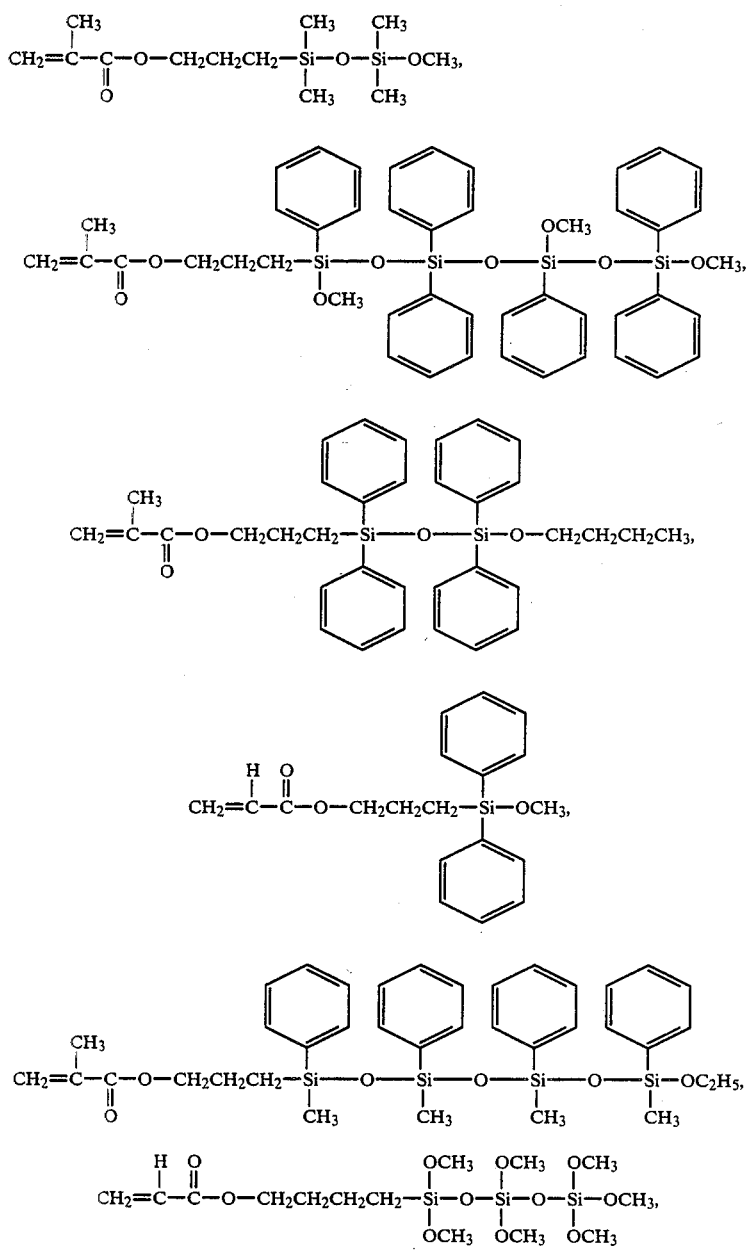

-continued
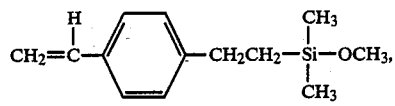
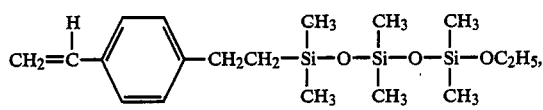
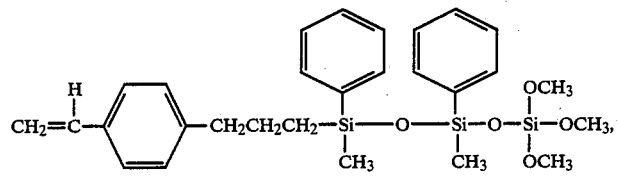
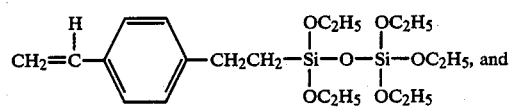
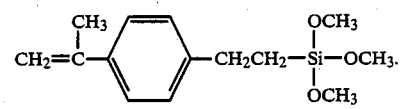
* * * * *